(12) United States Patent
Dimou et al.

(10) Patent No.: US 9,313,607 B2
(45) Date of Patent: Apr. 12, 2016

(54) NETWORK-ASSISTED UE DETECTION IN DIRECT MODE UE-TO-UE COMMUNICATION

(71) Applicant: Telefonaktiebolaget L M Ericsson (publ), Stockholm (SE)

(72) Inventors: Konstantinos Dimou, Stockholm (SE); Marco Belleschi, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 178 days.

(21) Appl. No.: 13/911,320

(22) Filed: Jun. 6, 2013

(65) Prior Publication Data

US 2014/0206322 A1   Jul. 24, 2014

Related U.S. Application Data

(60) Provisional application No. 61/754,250, filed on Jan. 18, 2013.

(51) Int. Cl.
*H04W 4/00*     (2009.01)
*H04W 76/02*    (2009.01)
*H04W 4/08*     (2009.01)
(Continued)

(52) U.S. Cl.
CPC .............. *H04W 4/005* (2013.01); *H04W 76/02* (2013.01); *H04W 76/023* (2013.01); *H04W 4/08* (2013.01); *H04W 88/02* (2013.01); *H04W 88/08* (2013.01); *Y02B 60/50* (2013.01)

(58) Field of Classification Search
None
See application file for complete search history.

(56) References Cited

U.S. PATENT DOCUMENTS

| 5,995,500 A | 11/1999 | Ma et al. |
| 8,005,108 B1 | 8/2011 | Broad et al. |
| 8,275,314 B1 | 9/2012 | Lin et al. |

(Continued)

FOREIGN PATENT DOCUMENTS

| WO | 2011087408 A1 | 7/2011 |
| WO | 2012152224 A1 | 11/2012 |

(Continued)

OTHER PUBLICATIONS

Design Aspects of Network Assisted Device-to-Device Communications by Fodor et al., dated May 2011.*

(Continued)

*Primary Examiner* — Daniel Lai
(74) *Attorney, Agent, or Firm* — Withrow & Terranova, PLLC (57) ABSTRACT

Systems and methods for network-assisted device discovery for device-to-device (D2D) communications are disclosed. In one embodiment, a base station in a cellular communications network receives a D2D request from a first wireless device to establish D2D communication. In response to the D2D request, the base station selects a second wireless device for D2D communication with the first wireless device based on the D2D request and information regarding wireless devices that are available for D2D communication. The base station then transmits a D2D request acknowledgment to the first wireless device that includes information that enables the first wireless device to establish D2D communication with the second wireless device. The base station also effects transmission of a D2D reconfiguration message to the second wireless device, where the D2D reconfiguration message includes information that informs the second wireless device that the first wireless device has requested establishment of D2D communication.

39 Claims, 5 Drawing Sheets

(51) Int. Cl.
*H04W 88/02* (2009.01)
*H04W 88/08* (2009.01)

(56) References Cited

U.S. PATENT DOCUMENTS

| | | | |
|---|---|---|---|
| 8,285,207 | B2 | 10/2012 | Kwon et al. |
| 8,634,777 | B2 | 1/2014 | Ekbatani et al. |
| 2004/0162871 | A1* | 8/2004 | Pabla et al. ............ 709/201 |
| 2005/0152283 | A1 | 7/2005 | Ritzenthaler |
| 2006/0168343 | A1 | 7/2006 | Ma et al. |
| 2007/0058559 | A1 | 3/2007 | Xu |
| 2007/0090919 | A1 | 4/2007 | Desai et al. |
| 2010/0330910 | A1 | 12/2010 | Yan et al. |
| 2011/0082940 | A1 | 4/2011 | Montemurro et al. |
| 2011/0258313 | A1* | 10/2011 | Mallik et al. ............ 709/224 |
| 2012/0243437 | A1* | 9/2012 | Horn et al. ............ 370/254 |
| 2012/0290650 | A1 | 11/2012 | Montuno et al. |
| 2013/0016646 | A1* | 1/2013 | Chang .......... H04W 76/023 370/312 |
| 2013/0160140 | A1 | 6/2013 | Jin et al. |
| 2013/0188515 | A1 | 7/2013 | Pinheiro et al. |
| 2013/0271270 | A1 | 10/2013 | Jamadagni et al. |
| 2013/0287012 | A1 | 10/2013 | Pragada et al. |
| 2013/0308551 | A1* | 11/2013 | Madan et al. ............ 370/329 |
| 2014/0004796 | A1 | 1/2014 | Cakulev et al. |
| 2014/0022986 | A1* | 1/2014 | Wu et al. ............ 370/328 |
| 2014/0056220 | A1 | 2/2014 | Poitau et al. |
| 2014/0078952 | A1 | 3/2014 | Bontu et al. |
| 2014/0094162 | A1 | 4/2014 | Heo et al. |
| 2014/0105096 | A1 | 4/2014 | Wang et al. |
| 2014/0187283 | A1 | 7/2014 | Nimbalker et al. |
| 2014/0219261 | A1 | 8/2014 | Johnsson |
| 2014/0269518 | A1 | 9/2014 | Nigam et al. |
| 2014/0295826 | A1 | 10/2014 | Choi et al. |
| 2014/0321314 | A1 | 10/2014 | Fodor et al. |
| 2014/0328287 | A1 | 11/2014 | Etemad et al. |

FOREIGN PATENT DOCUMENTS

| | | |
|---|---|---|
| WO | 2013172755 A1 | 11/2013 |
| WO | 2014070058 A1 | 5/2014 |
| WO | 2014171272 A1 | 11/2014 |

OTHER PUBLICATIONS

International Search Report and Written Opinion for PCT/IB2014/058305, mailed Jul. 22, 2014, 13 pages.

Wu, Xinzhou et al., "FlashLinQ: A Synchronous Distributed Scheduler for Peer-to-Peer Ad Hoc Networks," IEEE/ACM Transactions on Networking, vol. 21, Issue 4, Aug. 2013, 8 pages.

3GPP TS 36.331, "3rd Generation Partnership Project; Technical Specification Group Radio Access Network; Evolved Universal Terrestrial Radio Access (E-UTRA); Radio Resource Control (RRC); Protocol Specification (Release 11)," V11.0.0, Jun. 2012, 302 pages.

International Preliminary Report on Patentability for International Patent Application No. PCT/IB2014/061273, mailed Nov. 19, 2015, 11 pages.

Author Unknown, "Technical Specification Group Radio Access Network; Evolved Universal Terrestrial Radio Access (E-UTRA); Radio Resource Control (RRC); Protocol specification (Release 11)," Technical Specification 36.331, Version 11.1.0, 3GPP Organizational Partners, Sep. 2012, 325 pages.

Author Unknown, "Technical Specification Group Radio Access Network; Evolved Universal Terrestrial Radio Access Network (E-UTRAN); X2 application protocol (X2AP)(Release 11)," Technical Specification 36.423, Version 11.0.0, 3GPP Organizational Partners, Mar. 2012, 134 pages.

Doppler, Klaus et al., "Device-to-Device Communication as an Underlay to LTE-Advanced Networks," IEEE Communications Magazine, vol. 47, Issue 12, Dec. 2009, IEEE, pp. 42-49.

Huawei et al., "R2-134403: Options for Discovery Message Format and Identifiers," 3rd Generation Partnership Project (3GPP), TSG RAN WG2 Meeting #84, Nov. 11-15, 2013, 6 pages, San Francisco, U.S.

Research in Motion UK Limited, "R1-131350: Scenarios and Evaluation of Proximity Services Under Network Coverage," 3rd Generation Partnership Project (3GPP), TSG-RAN WG1 #72b, Apr. 15-19, 2013, 4 pages, Chicago, USA.

Secretary of SA WG2, "S2-140574: Draft Report of SA WG2 meetings #101," 3rd Generation Partnership Project (3GPP), SA WG2 Meeting #101bis, Version 0.0.9rm, Feb. 17-21, 2014, 240 pages, San Jose Del Cabo, Mexico.

Tournoux, Pierre-Ugo et al., "The Accordion Phenomenon: Analysis, Characterization, and Impact on DTN Routing," IEEE Infocom 2009, Apr. 19-25, 2009, Rio de Janeiro, Brazil, IEEE, pp. 1-9.

Non-Final Office Action for U.S. Appl. No. 13/942,056, mailed Mar. 27, 2015, 16 pages.

Final Office Action for U.S. Appl. No. 13/942,056, mailed Jul. 17, 2015, 19 pages.

International Search Report for International Patent Application No. PCT/IB2014/061273, mailed Sep. 11, 2014, 5 pages.

Non-Final Office Action for U.S. Appl. No. 13/942,056, mailed Feb. 1, 2016, 15 pages.

\* cited by examiner

NETWORK-ASSISTED UE DETECTION IN DIRECT MODE UE-TO-UE COMMUNICATION

RELATED APPLICATIONS

This application claims the benefit of provisional patent application Ser. No. 61/754,250, filed Jan. 18, 2013, the disclosure of which is hereby incorporated herein by reference in its entirety.

FIELD OF THE DISCLOSURE

The present disclosure relates to network-assisted Device-to-Device (D2D) communication.

BACKGROUND

Within the 3$^{rd}$ Generation Partnership Project (3GPP) standards, Device-to-Device (D2D) communication is an important application scenario. A fundamental issue that must be addressed for D2D communication is device discovery. Broadly speaking, device discovery is a technique widely investigated both in the industry and in research for many applications. Most common applications are in the area of self-establishing mesh networks (e.g., self-establishing mesh networks in the IEEE 802.15.4 standard) and in Bluetooth® networks. Usually, in order to perform device discovery, devices interested in D2D communication periodically broadcast signals (e.g., beacons). A particular device can then detect neighboring devices or network coordinators (e.g., routers) by detecting their corresponding broadcast signals. For instance, in IEEE 802.15.4, beacons are transmitted in specific slots after accessing the channel via a Carrier Sense Multiple Access/Collision Avoidance (CSMA/CA) protocol.

In the context of 3GPP cellular communications networks, different methods for performing device discovery have been recently proposed. For instance, methods for device discovery by employing Reed-Muller codes with compressed sensing or Cell Radio Network Temporary Identifier (C-RNTI) based mechanisms have been proposed. Another method for device discovery (or peer discovery) is described in Xinzhou Wu et al., "FlashLinQ: A Synchronous Distributed Scheduler for Peer-To-Peer Ad Hoc Networks," Allerton Conference, September 2010 (hereinafter the "FlashLinQ article"). While the primary focus of the FlashLinQ article is not device discovery, the FlashLinQ article provides a brief discussion of a peer discovery scheme in which peer discovery is done at well-defined time slots and well-defined frequency blocks of an Orthogonal Frequency Division Multiplexing (OFDM) system and all devices participate in the broadcasting of connection identities.

There are several issues with existing device discovery schemes. Some of the main issues relate to the broadcasting of beacons by devices interested in D2D communication. In particular, the broadcasting of beacons involves a significant amount of signaling. Moreover, this broadcast transmission results in significant energy consumption for the devices. In case of D2D communication taking place in the licensed spectrum of a cellular communications network, the amount of signaling due to broadcasting of beacons is prohibitively high. In the FlashLinQ article, the authors suggest using the timing of the wireless network such that devices transmit and listen for beacons in specific time and frequency resources. This is indeed a reduction of the overhead generated from the beacons transmitted by devices, and the energy consumed by the devices is less than when using other beacon transmission techniques. However, the device discovery scheme in the FlashLinQ article is still less than optimal and there is a desire to further reduce signaling overhead and energy consumption by the devices.

Another issue with existing device discovery schemes is that, in order to coexist with an air interface of an existing cellular communications network, most of the existing device discovery schemes require several modifications to the air interface. As an example, in the FlashLinQ article, the authors propose a framework for D2D communication within an OFDM based system that involves communication in specific OFDM tones and scheduling of connections to different frequency and time slots based on priorities. Thus, the system disclosed in the FlashLinQ article utilizes a framework for D2D communication that is a hybrid solution consisting of both cellular network control and decentralized control from the devices. As an example, device detection is dictated by the cellular communications network by setting the frequency blocks and the time slots of the cellular communications network to be used by devices during the device discovery procedure. Some of the devices participate in the procedure by broadcasting connection identities while other devices participate in the procedure by listening to the broadcast. This type of solution results in participation in the device discovery procedure by several devices that might not be needed. The gains in energy consumptions and signaling overhead from this type of device discovery scheme are far from optimal.

In light of the discussion above, there is a need for systems and methods for device discovery for D2D communication that reduce signaling overhead and power consumption.

SUMMARY

Systems and methods for network-assisted device discovery for Device-to-Device (D2D) communications are disclosed. In one embodiment, a base station in a cellular communications network receives a D2D request from a first wireless device in a cell served by the base station to establish D2D communication. In response to the D2D request, the base station selects a second wireless device for D2D communication with the first wireless device from multiple wireless devices that are available for D2D communication based on the D2D request and information regarding the wireless devices that are available for D2D communication. The base station then transmits a D2D request acknowledgment to the first wireless device, where the D2D request acknowledgment includes information that enables the first wireless device to establish D2D communication with the second wireless device. The base station also effects transmission of a D2D reconfiguration message to the second wireless device, where the D2D reconfiguration message includes information that informs the second wireless device that the first wireless device has requested establishment of D2D communication. In this manner, the cellular communications network provides a network-assisted device discovery mechanism that has low signaling overhead and also minimizes power consumption at wireless devices that are either seeking to establish D2D communication or are available for D2D communication.

In one embodiment, a wireless device configured to operate in a cellular communications network transmits a D2D request to a base station in the cellular communications network. In response to transmitting the D2D request, the wireless device receives a D2D acknowledgment from the base station, where the D2D acknowledgement includes information that enables the wireless device to establish D2D communication with a second wireless device. The wireless device then transmits a D2D access request to the second wireless device utilizing information in the D2D acknowledgment from the base station. In response to the D2D access request, the wireless device receives a D2D access acknowledgment from the second wireless device. After receiving the D2D access acknowledgment, the wireless device performs D2D communication with the second wireless device. In one embodiment, the D2D communication is performed in either an uplink frequency band or a downlink frequency band of the cellular communications network. In another embodiment, the D2D communication is performed in a frequency band that is not licensed to the cellular communications network.

In another embodiment, a wireless device configured to operate in a cellular communications network transmits D2D information to a base station in the cellular communications network, where the D2D information is related to availability of the wireless device for D2D communication. In one embodiment, the D2D information includes information that is indicative of content available for sharing from the wireless device via D2D communication, information that is indicative of one or more services available for sharing from the wireless device via D2D communication, information that is indicative of one or more frequency bands supported by the wireless device for D2D communication, or any combination thereof. After transmitting the D2D information, the wireless device receives a D2D reconfiguration message from the base station, where the D2D reconfiguration message informs the wireless device that D2D communication has been requested by a second wireless device. Thereafter, the wireless device receives a D2D access request from the second wireless device and, in response, transmits a D2D access acknowledgement to the second wireless device. The wireless device then performs D2D communication with the second wireless device. In one embodiment, the D2D communication is performed in either an uplink frequency band or a downlink frequency band of the cellular communications network. In another embodiment, the D2D communication is performed in a frequency band that is not licensed to the cellular communications network.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods that provide network-assisted device discovery for Device-to-Device (D2D) communication are provided. Device discovery, which is sometimes referred to as neighbor discovery or peer discovery, is a procedure that enables wireless devices that are in proximity to, or in the vicinity of, one another to detect each other and then establish D2D communication. While the present disclosure is not limited to any particular type of cellular communications network, device discovery is expected to play an important role in new peer-to-peer, or D2D, services that will be supported by future $3^{rd}$ Generation Partnership Project (3GPP) Long Term Evolution (LTE)-Advanced features, such as D2D communication. As used herein, D2D communication is direct wireless communication between wireless devices that are in proximity to one another via a direct radio link (i.e., a D2D bearer). D2D communication promises to be a good candidate to support modern wireless peer-to-peer services in which, for example, end-users can share content and/or services with other users in their surrounding area (e.g., share a large amount of data, share business and entertainment interests such as, for example, social networking, share applications such as gaming applications, or the like).

Figure 1:
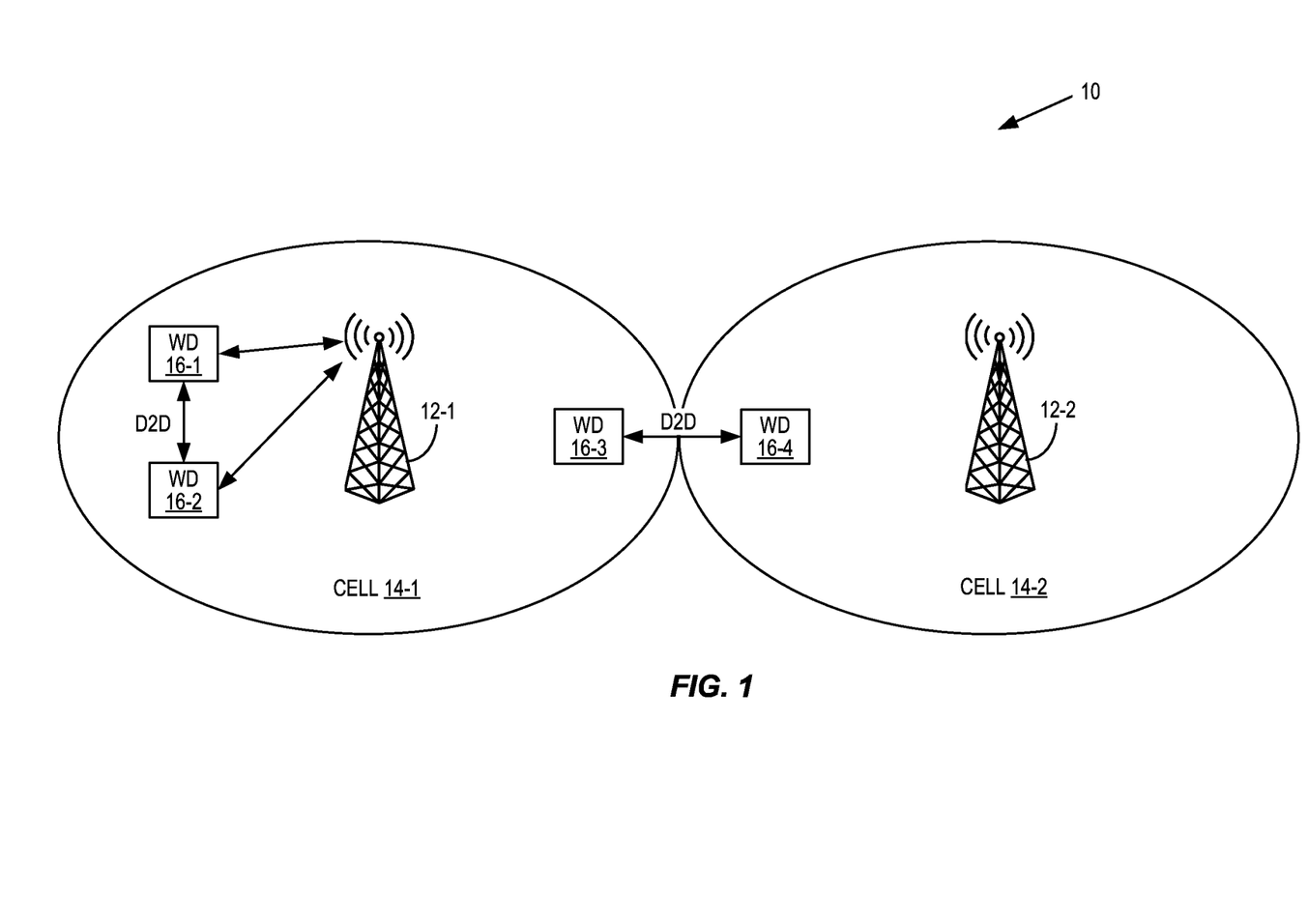
FIG. 1 illustrates a cellular communications network that provides network-assisted device discovery for Device-to-Device (D2D) communication according to one embodiment of the present disclosure.

In this regard, FIG. 1 illustrates a cellular communications network 10 that provides network-assisted device discovery according to one embodiment of the present disclosure. In many of the embodiments described herein, the cellular communications network 10 is a 3GPP LTE cellular communications network and, as such, 3GPP LTE terminology is at times used. However, the present disclosure is not limited to 3GPP LTE. Rather, the concepts disclosed herein can be used in any suitable type of cellular communications network that desires to provide network-assisted device discovery. As illustrated, the cellular communications network 10 includes base stations 12-1 and 12-2 (generally referred to herein collectively as base stations 12 and individually as base station 12) that serve corresponding cells 14-1 and 14-2 (generally referred to herein collectively as cells 14 and individually as cell 14). For LTE, the base stations 12 are preferably enhanced Node Bs (eNBs). However, one or both of the base stations 12 may alternatively be low power base stations (e.g., pico or femto base stations). Note that while only two base stations 12 are illustrated for clarity and ease of discussion, the cellular communications network 10 generally includes numerous base stations 12.

The base stations 12 operate to provide network-assisted device discovery for D2D communication. Note that while the discussion below focuses on embodiments in which the base stations 12 operate to provide network-assisted device discovery, it should be noted that the functionality of the base stations 12 described herein with respect to network-assisted device discovery may additionally or alternatively be performed by other types of nodes in the cellular communications network 10 (e.g., relays). In this particular example, the base station 12-1 performs a network-assisted device discovery procedure by which a wireless device (WD) 16-1 discovers a wireless device 16-2 that is in proximity to the wireless device 16-1. As a result of the device discovery procedure, the wireless device 16-1 is enabled to establish D2D communication with the wireless device 16-2. In addition, in this example, the base stations 12-1 and 12-2 perform a device discovery procedure by which a wireless device 16-3 discovers a wireless device 16-4 that is in proximity to the wireless device 16-3 but located in a different cell 14, namely the cell 14-2. As a result of the device discovery procedure, the wireless device 16-3 is enabled to establish D2D communication with the wireless device 16-4. The D2D communication between the wireless devices 16-1 and 16-2 and the D2D communication between the wireless devices 16-3 and 16-4 can use either a licensed frequency band of the cellular communications network 10 (e.g., either an uplink frequency band or a downlink frequency band of the cellular communications network 10) or some frequency band other than the licensed frequency band of the cellular communications network 10 (e.g., an unlicensed frequency spectrum or a frequency band of another cellular communications network). Notably, when using a frequency band other than a frequency band in the licensed spectrum of the cellular communications network 10, the wireless devices 16 about to communicate via a D2D link can use synchronization signals of the cellular communications network 10 and other signals broadcast or otherwise provided by the cellular communications network 10 for signaling purposes (i.e., device detection, direct connection establishment, allocation of resources to the D2D connection, connection (link) maintenance, etc.). For instance, synchronization, device detection, and resource allocation can be performed using the licensed frequency band, whereas exchange of data can be performed in an unlicensed frequency band.

Figure 2:
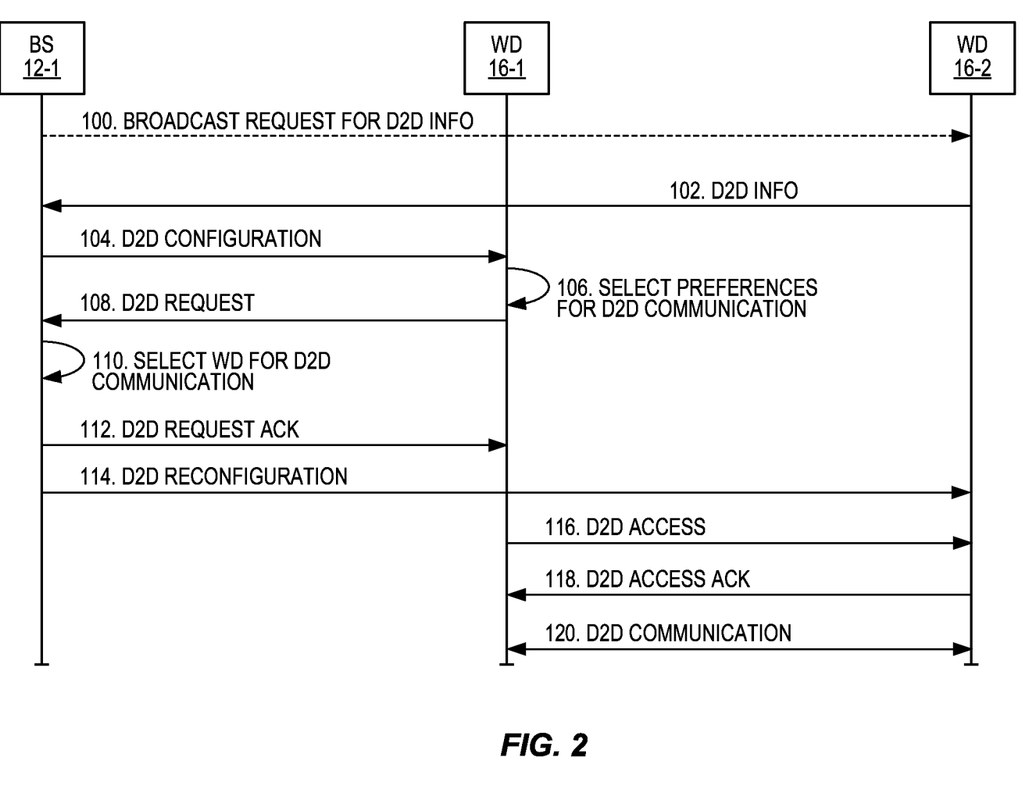
FIG. 2 illustrates the operation of the cellular communications network to provide network-assisted device discovery for D2D communication according to one embodiment of the present disclosure.

FIG. 2 illustrates the operation of the cellular communications network 10 to provide network-assisted device detection according to one embodiment of the present disclosure. In this particular example, the base station 12-1 performs a network-assisted device discovery procedure by which the wireless device 16-1 discovers the wireless device 16-2. As illustrated, the network-assisted device discovery procedure is optionally triggered when the base station 12-1 broadcasts a request for D2D information (step 100). The request can be an explicit request for D2D information from wireless devices 16 in the cell 14-1 that are available for D2D communication. Alternatively, the request can be an implicit request for D2D information from wireless devices 16 in the cell 14-1 that are available for D2D communication (e.g., a notification that the base station 12-1 supports device discovery for D2D communication). Again, step 100 is optional. Further, the network-assisted device discovery procedure is not limited to be triggered by a request for D2D information. Rather, the network-assisted device discovery procedure can be triggered in any desired manner.

In this embodiment, the wireless device 16-2 transmits D2D information to the base station 12-1 (step 102). While FIG. 2 only illustrates D2D information being transmitted by the wireless device 16-2, it should be understood that any or all of the wireless devices 16 in the cell 14-1 that are available for D2D communication (or in other words are interested in or willing to participate in D2D communication) also transmit D2D information to the base station 12-1 in the same manner. The D2D information transmitted by the wireless device 16-2 includes information that is indicative of one or more of the following:

content available for sharing from the wireless device 16-2 via D2D communication, which may include a listing of individual content items (e.g., particular songs, particular videos, particular news items, or the like) available for sharing or a listing of one or more content types (e.g., video, music, news, or the like) available for sharing and/or a listing of content types (e.g., songs, videos, news, or the like), services available for sharing from the wireless device 16-2 via D2D communication, which may include a listing of individual services (e.g., particular social networking applications, particular gaming applications, or the like) available for sharing or a listing of one or more service types (e.g., social networking, gaming, or the like) available for sharing, supported frequency bands for D2D communication (e.g., LTE, Global System for Mobile Communications (GSM), High Speed Packet Access (HSPA), unlicensed frequency band(s), or the like), maximum data rate supported by the wireless device 16-2 for D2D communication, which may be an actual hardware limitation of the wireless device 16-2 or an artificial maximum set, for example, by a user of the wireless device 16-2, maximum connection time supported for D2D communication (e.g., a maximum amount of time that the wireless device 16-2 is willing to participate in a particular D2D communication session), and activity (i.e., on or off), which refers to whether the wireless device 16-2 is currently active in the cellular communications network 10 (i.e., in CONNECTED state) or is currently inactive in the cellular communications network 10 (i.e., in IDLE state) and/or whether the wireless device 16-2 is currently willing to participate in a D2D communication session (i.e., there may be situations in which the wireless device 16-2 transmits its D2D information but is not, at that particular time, willing to participate in D2D communication in which case the activity would be set to "off").

For LTE, in one embodiment, the wireless device 16-2 transmits the D2D information as part of the Uplink Shared Channel (UL-SCH). More specifically, in one particular embodiment, the wireless device 16-2 transmits the D2D information as an Information Element (IE) of a Radio Resource Control (RRC) message such as an RRC connection request upon an RRC connection establishment as described in 3GPP Technical Specification (TS) 36.331, v.11.0.0. One example of such an IE of an RRC message that can be used to transmit the D2D information includes a listing of content and/or services available for sharing from the wireless device 16-2, a listing of frequency bands supported by the wireless device 16-2 for D2D communication, a maximum data rate supported by the wireless device 16-2 for D2D communication, a maximum connection time supported by the wireless device 16-2 for D2D communication, and an activity indicator.

By using an RRC message to transmit the D2D information, the wireless device 16-2 is enabled to transmit the D2D information to the base station 12-1 when the wireless device 16-2 establishes an RRC connection for another purpose (e.g., a normal phone call) or when the wireless device 16-2 attempts an RRC connection for the sole purpose of transmitting the D2D information in which case the wireless device 16-2 closes the RRC connection after transmitting the D2D information. In one embodiment, when transmitting the D2D information via an RRC Connection Request message, the wireless device 16-2 sets an establishment clause, as defined in 3GPP TS 36.331, v11.0.0, of the RRC Connection Request message to "D2D" or a similar indicator that the RRC Connection Request is solely for transmitting the D2D information. Rather than using an existing RRC message to transmit the D2D information, the wireless device 16-2 may alternatively transmit the D2D information using a separate appositely defined RRC message for transmitting D2D information (e.g., an RRC D2D Info message).

In one embodiment, the wireless device 16-2 periodically transmits the D2D information, or otherwise repeats transmission of the D2D information, to the cellular communications network 10. For example, the wireless device 16-2 may transmit the D2D information each time the wireless device 16-2 moves to a new cell 14. Note, however, that if the wireless device 16-2 is a stationary device (e.g., a wireless sensor), the wireless device 16-2 may transmit the D2D information only once. However, even if the wireless device 16-2 is a stationary device, the D2D information may be re-transmitted or updated if, for example, the D2D information includes information indicative of content and/or services available from the wireless device 16-2 and there is a change to the content and/or services available from the wireless device 16-2.

After receiving the D2D information from the wireless device 16-2, the base station 12-1 transmits a D2D configuration message to the wireless device 16-1 (step 104). The D2D configuration message generally includes information related to the wireless devices 16, including the wireless device 16-2, that are available for D2D communication. In the embodiment of FIG. 2, the wireless devices 16 that are available for D2D communication include, and may consist only of, one or more, and preferably two or more, wireless devices 16 that are located in the cell 14-1 and from which the base station 12-1 has received D2D information. Note, however, that the wireless devices 16 that are available for D2D communication may, in some embodiments, additionally include wireless devices 16 in neighboring cells (e.g., the cell 14-2), as discussed below with respect to the embodiment of FIG. 3.

In one embodiment, the D2D configuration message includes one or more of the following:
  information that is indicative of the wireless devices 16 that are currently available for D2D communication in the same cell 14-1 (and possibly in neighboring cells, e.g., the cell 14-2),
  information that is indicative of the services (i.e., particular services and/or service types) available for sharing from the wireless devices 16 that are currently available for D2D communication in the same cell 14-1 (and possibly in neighboring cells, e.g., the cell 14-2),
  information that is indicative of the content (i.e., particular content items and/or content types) available for sharing from the wireless devices 16 that are currently available for D2D communication in the same cell 14-1 (and possibly in neighboring cells, e.g., the cell 14-2),
  information that is indicative of the frequency bands supported for D2D communication by the wireless devices 16 that are currently available for D2D communication in the same cell 14-1 (and possibly in neighboring cells, e.g., the cell 14-2),
  information that is indicative of Random Access Channel (RACH) preambles to be utilized for random access to the wireless devices 16 that are currently available for D2D communication in the same cell 14-1 (and possibly in neighboring cells, e.g., the cell 14-2),
  information that is indicative of the maximum data rates for D2D communication supported by the wireless devices 16 that are currently available for D2D communication in the same cell 14-1 (and possibly in neighboring cells, e.g., the cell 14-2), and
  information that is indicative of maximum connection times for D2D communication supported by (or allowed by) the wireless devices 16 that are currently available for D2D communication in the same cell 14-1 (and possibly in neighboring cells, e.g., the cell 14-2).

In one particular embodiment, the D2D configuration message includes a list of the wireless devices 16 that are currently available for D2D communication in the same cell 14-1 (and, in some embodiments, possibly in neighboring cells, e.g., the cell 14-2), where for each wireless device 16 that is currently available for D2D communication, the list includes: information that identifies the wireless device 16 in the cellular communications network 10 (e.g., Cell Radio Network Temporary Identifier (C-RNTI) and/or short Message Authentication Code for data Integrity (MAC-I) and Physical Cell Identity (PCI)), a listing of services and/or content available for sharing from the wireless device 16, and a listing of frequency band(s) supported by the wireless device 16 for D2D communication (e.g., GSM, HSPA, LTE, unlicensed frequency band(s), or the like). In addition, the list of wireless devices 16 may include, for each wireless device 16 in the list, a listing of RACH preamble(s), or equivalently RACH preamble identifier(s), for random access to the wireless device 16 for D2D communication. Still further, the list of wireless devices 16 may include, for each wireless device 16 in the list, a maximum data rate supported by the wireless device 16 for D2D communication and/or a maximum connection time supported by (or permitted by) the wireless device 16 for D2D communication.

In one embodiment, the base station 12-1 broadcasts the D2D configuration message to all wireless devices 16 located in the cell 14-1. The base station 12-1 preferably broadcasts the D2D configuration message periodically or in some other repeated fashion. More specifically, in one particular embodiment, for LTE, the D2D configuration message is transmitted using an existing or appositely defined System Information Block (SIB) on the Broadcast Channel (BCH). As such, the SIB (and thus the D2D configuration message) can be read by wireless devices 16, including the wireless device 16-1, regardless of whether the wireless devices 16 are in CONNECTED or IDLE mode.

In one embodiment, the D2D configuration message includes information regarding the availability of all of wireless devices 16 in the cell 14-1 (and, in some embodiments, possibly neighboring cells 14, e.g., the cell 14-2) that are available for D2D communication. However, in terms of scalability, the cellular communications network 10 (e.g., the base station 12-1) may limit the number of wireless devices 16 for which information is included in the D2D configuration message. For instance, if the D2D configuration message includes a list of the wireless devices 16 that are available for D2D communication in the cell 14-1 (and, in some embodiments, possibly the neighboring cell(s) 14) and their associated information (e.g., content and/or service(s) available for sharing, frequency bands supported for D2D communication, RACH preambles, etc.), the base station 12-1 may limit the list to a predetermined maximum number (K) of wireless devices 16. Thus, the list may include the predetermined maximum number (K) wireless devices 16 or fewer than K wireless devices 16. The predetermined maximum number (K) may be static or dynamic (i.e., change over time). For example, consider a scenario in which an event takes place within the cell 14-1 and several wireless devices 16 (or equivalently users of several wireless devices 16) desire to participate in D2D communication. In this scenario, the number of D2D information messages received by the base station 12-1 defines the number of wireless devices 16 for which information is to be included in the D2D configuration message. If the number of wireless devices 16 that sent D2D information is greater than the predetermined maximum number (K), then the base station 12-1 may include information for a number (L) of those wireless devices 16, where L≤M. In addition, wireless devices 16 for which information is included in the D2D configuration message may change over time. For instance, information for a particular wireless device 16 may be included in the D2D configuration message at one time and then removed at a later time unless, for example, a new D2D information message is received by the base station 12-1 from that wireless device 16. The values for K and L can be, for instance, a system constant that accounts for, as an example, the capacity/memory limitation of the base station 12-1 in handling multiple active D2D links. Alternatively, the values for K and L can be tuned according to, for example, the amount of active wireless devices 16 or interference in the cell 14-1.

After receiving the D2D configuration message, the wireless device 16-1 selects one or more preferences for D2D communication based on the D2D configuration message (step 106). More specifically, upon receiving the D2D configuration message, the wireless device 16-1 determines whether D2D communication is desired. This decision may be a decision regarding whether the wireless device 16-1 desires D2D communication in general or a decision regarding whether the wireless device 16-1 desires D2D communication with any of the wireless devices 16 that are currently available for D2D communication. If so, the wireless device 16-1 selects one or more preferences based on the information contained in the D2D configuration message.

In this embodiment, the one or more preferences include one or more of the following:
one or more preferred, or desired, wireless devices 16 for D2D communication selected from wireless devices 16 that are available for D2D communication identified in the D2D configuration message,
one or more preferred, or desired, services selected from services available for sharing identified in the D2D configuration message,
preferred, or desired, content selected from content available for sharing identified in the D2D configuration message,
one or more preferred, or desired, frequency bands for D2D communication selected from frequency bands supported by the wireless devices 16 available for D2D communication and identified in the D2D configuration message, and
one or more preferred, or desired, RACH preambles selected from RACH preambles identified in the D2D configuration message.

In one particular embodiment, the D2D configuration message includes a list of the wireless devices 16 that are available for D2D communication in the cell 14-1 (and, in some embodiments, possibly the neighboring cell(s) 14) along with their related information (e.g., shared services, shared content, supported frequency bands, RACH preambles, maximum data rate, maximum connection time, or the like). In this embodiment, the wireless device 16-1 utilizes the information in the D2D configuration message to select one or more preferred, or desired, wireless devices 16 for D2D communication. This decision can be made based on, for example, the services and/or content available for sharing from the wireless devices 16 as compared to the desired services and/or content of the wireless device 16-1, the supported frequency bands of the available wireless devices 16 as compared to the frequency band(s) supported by the wireless device 16-1 for D2D communication, the maximum data rates supported by the available wireless devices 16, and/or the maximum connection times supported by the available wireless devices 16.

Next, the wireless device 16-1 sends a D2D request to the base station 12-1 (step 108). The D2D request includes the one or more preferences selected in step 106. In one particular embodiment, the D2D request includes information that identifies one or more selected wireless devices 16 for D2D communication. In addition, for each selected wireless device 16, the D2D request may include a selected frequency band for D2D communication and/or a selected RACH preamble. In one embodiment, for LTE, the D2D request is transmitted as part of the RACH and a subsequent RRC Connection Establishment procedure using Physical Uplink Shared Channel (PUSCH). In particular, the D2D request may be mapped in a Signaling Radio Bearer (SRB) and embedded in an RRC Connection Request or an RRC Connection Reestablishment Request message. Alternatively, the D2D request may be transmitted in a new appositely defined RRC message for transmitting a D2D request.

In response to receiving the D2D request, the base station 12-1 selects a wireless device (WD) 16 for D2D communication with the wireless device 16-1 (step 110). In this particular example, the base station 12-1 selects the wireless device 16-2 for D2D communication with the wireless device 16-1. The base station 12-1 selects the wireless device 16-2 based on the one or more preferences of the wireless device 16-1 included in the D2D request. Preferably, the selection of the wireless device 16-2 is further based on geographical and/or radio locations of the wireless devices 16-1 and 16-2. The geographical locations and/or radio locations of the wireless devices 16-1 and 16-2 are utilized by the base station 12-1 to determine that the wireless devices 16-1 and 16-2 are in proximity to one another or, in other words, are sufficiently close to one another for D2D communication to be feasible.

The geographic locations of the wireless device 16-1 and the other wireless devices 16 available for D2D communication can be obtained by the base station 12-1 using any suitable technique(s). For example, the geographic locations of the wireless devices 16-1 and 16-2 may be established by the base station 12-1 based on the D2D request from the wireless device 16-1 and the D2D information message from the wireless device 16-2, respectively. In addition or alternatively, the wireless devices 16 in the cell 14-1, including the wireless devices 16-1 and 16-2, report their geographic locations (e.g., Global Positioning System (GPS) coordinates) to the base station 12-1.

Regarding radio locations, a radio location of a wireless device 16 is represented by one or more statistical values that are indicative of a radio distance between the wireless device 16 and one or more of the base stations 12 (e.g., the base station 12-1) and/or a radio distance between the wireless device 16 and one or more other wireless devices 16. For example, the radio location of a wireless device 16 may be represented by statistical information such as downlink Received Signal Strength Indication (RSSI), Reference Signal Received Power (RSRP), Reference Signal Received Quality (RSRQ), Channel Quality Indication (CQI), and/or Channel State Information (CSI) reported by the wireless device 16 and/or similar uplink measurements done at one or more of the base stations 12 (e.g., the base station 12-1). For a wireless device 16 in CONNECTED mode, the radio location of the wireless device 16 may additionally or alternatively include information regarding a transmit power level and a power margin for the wireless device 16. Using the radio locations of the wireless devices 16-1 and 16-2, the base station 12-1 is enabled to determine that D2D communication between the wireless devices 16-1 and 16-2 is feasible.

It should also be noted that, in one embodiment, D2D communication between the wireless devices 16-1 and 16-2 is to be over a licensed frequency band of the cellular communications network 10. Thus, in one embodiment, the base station 12-1 also selects the frequency band (i.e., the downlink frequency band or the uplink frequency band of the cellular communications network 10) to be used for D2D communication between the wireless devices 16-1 and 16-2. While any suitable criteria may be used for this decision, in one embodiment, the base station 12-1 selects the frequency band for D2D communication between the wireless devices 16-1 and 16-2 so as to optimize or minimize interference. Thus, for example, the base station 12-1 may select the downlink frequency band if either or both of the wireless devices 16-1 and 16-2 is near the base station 12-1 and select the uplink frequency band if both of the wireless devices 16-1 and 16-2 are far from the base station 12-1 (i.e., near the edge of the cell 14-1).

After selecting the wireless device 16-2 for D2D communication with the wireless device 16-1, the base station 12-1 sends a D2D request acknowledgement (ACK) to the wireless device 16-1 (step 112). The D2D request acknowledgment generally includes information that enables the wireless device 16-1 to establish D2D communication with the wireless device 16-2. More specifically, in one preferred embodiment, the D2D request acknowledgment includes information that enables the wireless device 16-1 to perform a Random Access procedure to establish communication with the wireless device 16-2. More specifically, in one embodiment in order to enable the Random Access procedure, the D2D request acknowledgment includes information that identifies the wireless device 16-2 (e.g., C-RNTI), a RACH preamble to be used for the Random Access procedure (or equivalently information that indicates the RACH preamble), and information that is indicative of a Physical Random Access Channel (PRACH) resource (e.g., a Physical Resource Block (PRB)) to be used for the Random Access procedure. In addition, the D2D request acknowledgement may include a PRACH power setting for the Random Access procedure. Still further, in some embodiments, the D2D request acknowledgment includes information that indicates the frequency band to be used for D2D communication. For LTE, the D2D request acknowledgment can be mapped to the SRB and embedded in an RRC Connection Reconfiguration message or transmitted in a new appositely defined RRC message for D2D request acknowledgements.

In addition to sending the D2D request acknowledgment to the wireless device 16-1, the base station 12-1 sends a D2D reconfiguration request to the wireless device 16-2 (step 114). The D2D reconfiguration request generally operates to inform the wireless device 16-2 that the wireless device 16-1 has requested D2D communication. As a result, the wireless device 16-2 knows that it should listen for a D2D access request from the wireless device 16-1. In one embodiment, the D2D reconfiguration request includes information that identifies the wireless device 16-1. For LTE, the information that identifies the wireless device 16-1 includes a C-RNTI of the wireless device 16-1 in the case where both of the wireless devices 16-1 and 16-2 are in the same cell 14 or a short MAC-I and PCI of the wireless device 16-1 in the case where the wireless devices 16-1 and 16-2 are located in different cells 14. In addition, the D2D reconfiguration request may include: information that is indicative of the service(s) and/or the content desired by the wireless device 16-1; information that is indicative of the RACH preamble to be used by the wireless device 16-1 to establish D2D communication; and/or information that is indicative of the PRACH resource to be used by the wireless device 16-1 to establish D2D communication.

Sometime thereafter, the wireless device 16-1 transmits a D2D access request to the wireless device 16-2 (step 116). In general, the D2D access request is a request to establish D2D communication between the wireless devices 16-1 and 16-2. As discussed above, in one preferred embodiment, D2D communication is established via a Random Access procedure. In this procedure, particularly for LTE, the D2D access request is transmitted in the RACH using the RACH preamble, the PRACH resource, and, in some embodiments, the PRACH power setting defined for the Random Access procedure. More specifically, in one embodiment, the D2D access request includes the information that identifies the wireless device 16-1 (e.g., C-RNTI or short MAC-I and PCI) and is transmitted using the RACH preamble for the wireless device 16-2 on the PRACH resource allocated for the D2D Random Access request from the wireless device 16-1 to the wireless device 16-2. As discussed above, the RACH preamble and the PRACH resource may be included in the D2D request acknowledgement and the D2D reconfiguration request transmitted from the base station 12-1 to the wireless devices 16-1 and 16-2, respectively. In addition, if the PRACH power setting is included in the D2D request acknowledgment, the wireless device 16-1 transmits the D2D access request at a power level that corresponds to the provided PRACH power setting.

It is assumed that both the wireless device 16-1 and the wireless device 16-2 are synchronized with the cellular communications network 10 and that their close proximity justifies a very small Timing Advance (TA) value epsilon, $\epsilon$. Moreover, as mentioned, the D2D request is transmitted at a well-defined radio resource (time and frequency) using a given sequence (e.g., a Zadoff-Chu sequence), which for LTE is the RACH preamble, that is known to both of the wireless devices 16-1 and 16-2 and can be used to provide synchronization for the direct link between the wireless devices 16-1 and 16-2. This initial TA value, $\epsilon$, may be transmitted/signaled to the wireless devices 16-1 and 16-2 from the cellular communications network 10 as, for example, an additional IE to the D2D access request and the D2D information messages.

In response to receiving the D2D access request, the wireless device 16-2 transmits a D2D access acknowledgment to the wireless device 16-1 (step 118). More specifically, upon identifying the wireless device 16-1, the wireless device 16-2 transmits the D2D access acknowledgment to the wireless device 16-1. The D2D access acknowledgment provides a grant for D2D communication as well as timing alignment needed for synchronization between the wireless devices 16-1 and 16-2. For LTE, if D2D communication is to be conducted in either the uplink or the downlink frequency band of the cellular communications network 10, the D2D access acknowledgment can be transmitted in either the UL-SCH or a Downlink Shared Channel (DL-SCH) according to whether the uplink or the downlink frequency band is to be used for D2D communication between the wireless devices

16-1 and 16-2. If D2D communication is to be conducted in an unlicensed frequency band, then the D2D access acknowledgement can be transmitted in the unlicensed frequency band.

From this point, the wireless devices 16-1 and 16-2 conduct D2D communication (step 120). More specifically, in one embodiment, D2D communication is conducted using either uplink or downlink resources of the cellular communications network 10 over a direct D2D link between the wireless devices 16-1 and 16-2. In another embodiment, D2D communication is conducted over a frequency band that is different from those of the cellular communications network 10 (e.g., an unlicensed frequency band) over a direct D2D link between the wireless devices 16-1 and 16-2. Thus, if, for example, D2D communication is over an unlicensed frequency band, steps 100-118 are performed in the licensed frequency band using signaling in the cellular communications network 10 whereas the D2D communication is conducted over the unlicensed frequency band. While not illustrated, in some embodiments if the frequency band used for the D2D connection is not known to the cellular communications network 10, either the wireless device 16-1 or the wireless device 16-2 transmits information that is indicative of the frequency band to the cellular communications network 10.

It should be noted that while in this embodiment the wireless device 16-1 transmits the D2D access request and the wireless device 16-2 transmits the D2D access acknowledgement, in another embodiment the wireless device 16-2 may initiate the D2D connection. More specifically, in steps 112 and 114, the base station 12-1 may alternatively provide information to the wireless device 16-2 that enables the wireless device 16-2 to establish a D2D connection with the wireless device 16-1 and provide information to the wireless device 16-1 that informs the wireless device 16-1 that the wireless device 16-2 will be requesting a D2D connection. The wireless device 16-2 then transmits a D2D access request to the wireless device 16-1, and the wireless device 16-1 responds with a D2D access acknowledgment.

It should also be noted that establishment of D2D communication between the wireless devices 16-1 and 16-2 might not always be successful. For example, a physical obstacle between the wireless devices 16-1 and 16-2 may result in a failed Random Access procedure such that D2D communication is not established. In this case, the wireless devices 16-1 and 16-2 may start transmitting beacons, which can serve as synchronization signals, in response to the failed establishment procedure. The beacon signals can have the form of Zadoff-Chu, Barker, Gold, M, Kasami, Walsh, or Hadamard sequences, which are known to have good autocorrelation and cross correlation properties. Transmitting beacons in this manner is preferable over conventional beacon transmission schemes because, here, beacons are only transmitted when needed (i.e., only when two wireless devices 16 are in proximity and only when there is common interest for direct connection). However, in the situation where there is an obstacle between the two wireless devices 16-1 and 16-2, the beacons may still not make D2D communication between the wireless devices 16-1 and 16-2 feasible.

Establishment of D2D communication between the wireless devices 16-1 and 16-2 may also be unsuccessful under certain scenarios even if there is no obstacle between the two wireless devices 16-1 and 16-2. For example, if the wireless devices 16-1 and 16-2 are at opposite sides of the cell 14-1, the wireless devices 16-1 and 16-2 may be too far apart to successfully establish D2D communication. In order to address this scenario, as discussed above, the base station 12-1 preferably considers the geographic and/or radio locations of the two wireless devices 16-1 and 16-2 when selecting the wireless device 16-2 for D2D communication with the wireless device 16-1. As an example, the base station 12-1 can consider statistics in downlink RSSI, RSRP, RSRQ, CQI, and CSI reported by the wireless devices 16-1 and 16-2, uplink measurements done at the base station 12-1 (and possibly other base stations 12), and/or geographic location information indicating the geographic locations of the wireless devices 16-1 and 16-2. If D2D communication is not feasible between the wireless devices 16-1 and 16-2, then the base station 12-1 will not select the wireless device 16-2 for D2D communication with the wireless device 16-1. This approach is preferable to beacon transmission even though some processing is required at the base station 12-1.

As a security measure, some wireless devices 16 may desire (or permit) D2D communication with only certain other wireless devices 16. Thus, in one embodiment, if the wireless device 16-2 desires D2D communication with only certain other wireless devices 16, the D2D information for the wireless device 16-2 transmitted in step 102 includes information that indicates that the wireless device 16-2 does not desire (or permit) D2D communication with all other wireless devices 16. In one particular embodiment, the D2D information can include a Closed Group (CG) IE. In one embodiment, the CG IE includes a general CG indicator. If the CG indicator is set in the D2D information of the wireless device 16-2 transmitted in step 102, the base station 12-1 does not broadcast or otherwise transmit information regarding the availability of the wireless device 16-2 for D2D communication in the D2D configuration message of step 104. Rather, upon receiving a D2D request from another wireless device 16, the base station 12-1 transmits information that identifies the other wireless device 16 to the wireless device 16-2. The wireless device 16-2 then returns information to the base station 12-1 that indicates whether D2D communication with the other wireless device 16 is desired (or permitted). In another embodiment, the CG IE includes a listing of other wireless devices 16 with which the wireless device 16-2 desires (or permits) D2D communication. The base station 12-1 may then either transmit information related to the availability of the wireless device 16-2 for D2D communication only to those identified wireless devices 16 or otherwise limit D2D communication with the wireless device 16-2 to those identified wireless devices 16.

Figure 3:
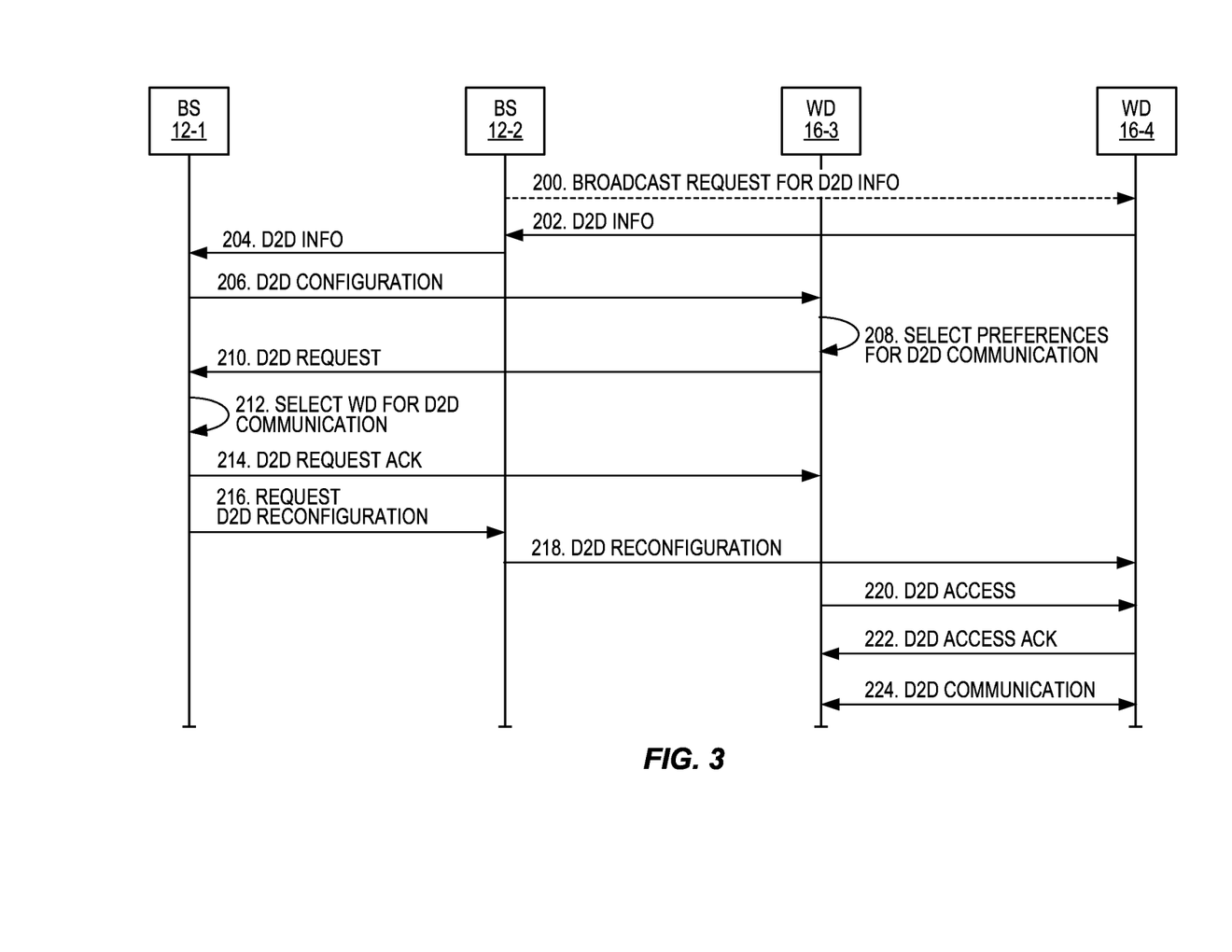
FIG. 3 illustrates the operation of the cellular communications network to provide network-assisted device discovery for D2D communication according to one embodiment of the present disclosure.

FIG. 3 illustrates the operation of the cellular communications network 10 to provide network-assisted device detection according to another embodiment of the present disclosure. This embodiment is substantially the same as that of FIG. 2 but where the procedure is applied to wireless devices 16 in different cells 14. In particular, in this example, the cellular communications network 10 provides network-assisted device discovery for D2D communication between the wireless devices 16-3 and 16-4, which are located in neighboring cells 14-1 and 14-2, respectively. As illustrated, the network-assisted device discovery procedure is optionally triggered when the base station 12-2 broadcasts a request for D2D information (step 200). The request can be an explicit request for D2D information from any wireless device 16 in the cell 14-2 that is available for D2D communication. Alternatively, the request can be an implicit request for D2D information from any wireless device 16 in the cell 14-2 that is available for D2D communication (e.g., a notification that the base station 12-2 supports device discovery for D2D communication). Again, step 200 is optional. Further, the network-assisted device discovery procedure can be triggered in any desired manner.

In this embodiment, the wireless device 16-4 transmits D2D information to the base station 12-2 in the same manner as described above with respect to step 102 of FIG. 2 (step 202). However, in this embodiment, the base station 12-2 sends the D2D information of the wireless device 16-4 to the base station 12-1 (step 204). In this manner, the D2D information of the wireless device 16-4 is available to both the base station 12-2 for device discovery within the cell 14-2 and the base station 12-1 for device discovery within the cell 14-1.

After receiving the D2D information of the wireless device 16-4, the base station 12-1 transmits a D2D configuration message to the wireless device 16-3 in the manner described above with respect to step 104 of FIG. 2 (step 206). In this embodiment, the D2D configuration message includes both information regarding the availability of wireless devices 16 within the cell 14-1 that are available for D2D communication as well as information regarding the availability of wireless devices 16 in the cell 14-2, such as the wireless device 16-4, that are available for D2D communication. After receiving the D2D configuration message, the wireless device 16-3 selects one or more preferences for D2D communication based on the D2D configuration message and sends a D2D request to the base station 12-1 in the same manner described above with respect to steps 106 and 108 of FIG. 2 (steps 208 and 210).

In response to receiving the D2D request, the base station 12-1 selects a wireless device 16 for D2D communication with the wireless device 16-3 (step 112). In this particular example, the base station 12-1 selects the wireless device 16-4 for D2D communication with the wireless device 16-3. As discussed above, the base station 12-1 selects the wireless device 16-4 based on the one or more preferences of the wireless device 16-4 and, in some embodiments, the geographic and/or radio locations of the wireless devices 16-3 and 16-4. As noted above, in one embodiment, D2D communication between the wireless devices 16-3 and 16-4 is to be over a licensed frequency band of the cellular communications network 10. Thus, in one embodiment, the base station 12-1 also selects the frequency band (i.e., the downlink frequency band or the uplink frequency band) to be used for D2D communication between the wireless devices 16-3 and 16-4 using any suitable decision process.

After selecting the wireless device 16-4 for D2D communication with the wireless device 16-3, the base station 12-1 sends a D2D request acknowledgement to the wireless device 16-3 as discussed above with respect to step 112 of FIG. 2 (step 214). However, in this embodiment, since the wireless device 16-4 is in the cell 14-2, the base station 12-1 sends a request, or instruction, to the base station 12-2 to send a D2D reconfiguration request to the wireless device 16-4 (step 216). In response, the base station 12-2 sends the D2D reconfiguration request to the wireless device 16-4 in the manner described above (step 218). Note that the request in step 216 includes any information needed by the base station 12-2 to send the D2D reconfiguration request to the wireless device 16-4 (e.g., short MAC-I and PCI of the wireless device 16-3; information that is indicative of the service(s) and/or content desired by the wireless device 16-3; information that is indicative of the PRACH resource to be used by the wireless device 16-3 to establish D2D communication; and/or information that is indicative of the RACH preamble to be used by the wireless device 16-3 to establish D2D communication).

Sometime thereafter, the wireless device 16-3 transmits a D2D access request to the wireless device 16-4, and the wireless device 16-4 returns a D2D access acknowledgement to the wireless device 16-3 in the same manner discussed above with respect to steps 116 and 118 of FIG. 2 (steps 220 and 222). From this point, the wireless devices 16-3 and 16-4 conduct D2D communication (step 224). More specifically, in one embodiment, D2D communication is conducted using either uplink or downlink resources of the cellular communications network 10 over a direct D2D link between the wireless devices 16-3 and 16-4. In another embodiment, D2D communication is conducted over a frequency band that is different from those of the cellular communications network 10 (e.g., an unlicensed frequency band) over a direct D2D link between the wireless devices 16-3 and 16-4. While not illustrated, in some embodiments if the frequency band used for the D2D connection is not known to the cellular communications network 10, either the wireless device 16-3 or the wireless device 16-4 transmits information that is indicative of the frequency band to the cellular communications network 10.

The network-assisted device discovery procedures described herein provide many advantages. While not being limited by or to any particular advantage, the network-assisted device discovery procedures can result in gains for the wireless devices 16, namely, the wireless devices 16 can get synchronization from the cellular communications network 10. This allows the use of an extended, long sleeping mode (e.g., long Discontinuous Reception (DRX) cycles) which can result in significant battery life gains for the wireless devices 16. In addition, the D2D connection is more protected from interference if interference is managed by the cellular communications network 10.

Further, embodiments of the network-assisted device discovery procedures described herein leverage existing random access procedures in order to allow a given D2D-capable wireless device 16 to access another D2D-capable wireless device 16 that can share specific services/contents. This results in a method in which the amount of signaling exchanged for establishment of the D2D connection is minimized. Further, compared with beacon-based D2D device detection mechanisms, the network-assisted device discovery procedures described herein limit interference pollution, which is typically generated by beacon transmissions for the device discovery in D2D communication. Still further, the network-assisted device discovery procedures described herein provide an efficient solution for device discovery between two specific wireless devices 16 that want to communicate directly, especially in the scenario where there are several other wireless devices 16 in the vicinity of the two wireless devices 16. Otherwise, the two specific wireless devices 16 would need to exchange beacons and, in the scenario where several other wireless devices 16 are in the vicinity, beacon collisions might occur and collision resolution has to take place. Moreover beacon transmissions might cause severe interference to other wireless devices 16 (e.g., non-D2D-capable wireless devices 16). Still further, embodiments of the network-assisted device discovery procedures described herein are functional even when both or one of the wireless devices 16 are in IDLE mode.

Figure 4:
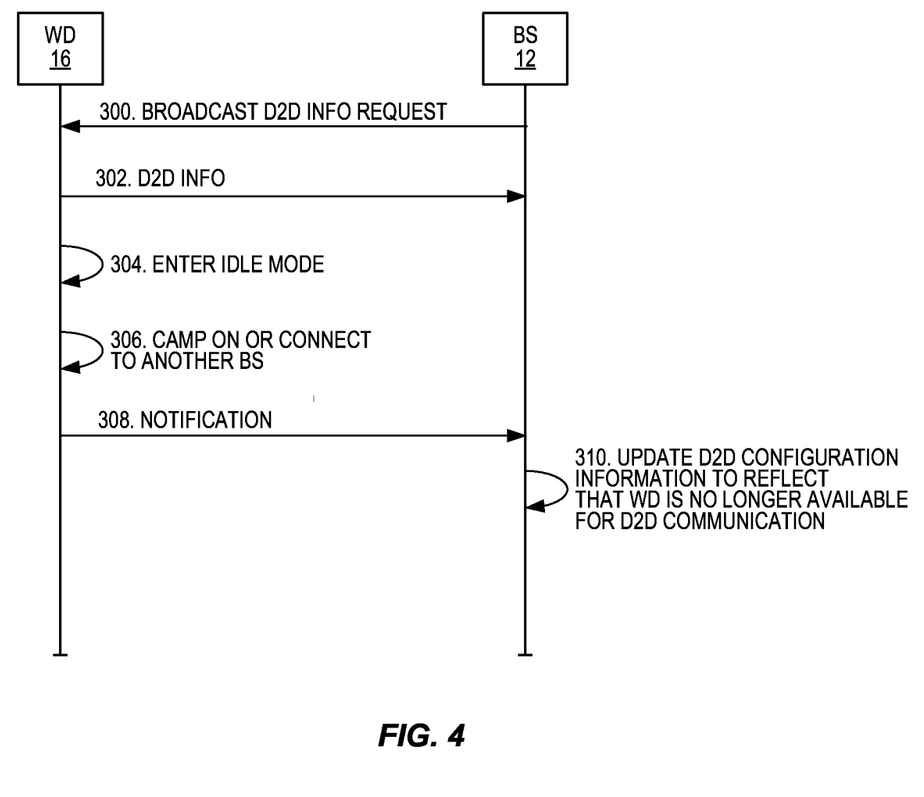
FIG. 4 illustrates the operation of a wireless device to transmit D2D information to a base station in the cellular communications network and, upon leaving a cell served by the base station, notifying the base station according to one embodiment of the present disclosure.

Thus far, the discussion has focused on network-assisted device discovery. FIG. 4 illustrates the operation of a wireless device 16 to transmit D2D information to a base station 12 and subsequently notify the base station 12 when the wireless device 16 camps on or connects to another base station 12 according to one embodiment of the present disclosure. In particular, in LTE, a wireless device 16 that is in IDLE mode does not normally notify a base station 12 that it is camped on when the wireless device 16 moves to another cell 14 (i.e., camps on or connects to another base station 12). With respect to the embodiments of the network-assisted device discovery procedure described above, this would create an issue in that the D2D configuration message transmitted by the base station 12 could contain information regarding the availability of the wireless device 16 for D2D communication after the wireless device 16 moves to another cell 14 and is no longer available for D2D communication with wireless devices 16 in the cell 14 of the original base station 12. The process of FIG. 4 allows the base station 12 to remove information regarding the availability of a wireless device 16 from the D2D configuration message when the wireless device 16 moves to another cell 14 and is no longer available for D2D communication with other wireless devices 16 in the cell 14.

As illustrated, in this embodiment, the base station 12 broadcasts a request for D2D information (step 300). In response, the wireless device 16 transmits D2D information for the wireless device 16 to the base station 12 (step 302). The wireless device 16 then, at some point, enters IDLE mode (step 304). Sometime thereafter, the wireless device 16 camps on or connects to another base station (BS) 12 (or equivalently camps on or connects to another cell 14) (step 306). In response, the wireless device 16 transmits a notification to the base station 12 (step 308). The notification may alternatively be transmitted just prior to the time that the wireless device 16 camps on or connects to the other base station 12 (e.g., after a decision to camp on or connect to the other base station 12 but prior to camping on or connecting to the other base station 12). The notification informs the base station 12 that the wireless device 16 is no longer in the cell 14 served by the base station 12. In response to the notification, the base station 12 updates the D2D configuration information to reflect that the wireless device 16 is no longer available for D2D communication (step 310). As a result, future D2D configuration message(s) transmitted by the base station 12 will not include information that indicates that the wireless device 16 is available for D2D communication with other wireless devices 16 in the cell 14.

Figure 5:
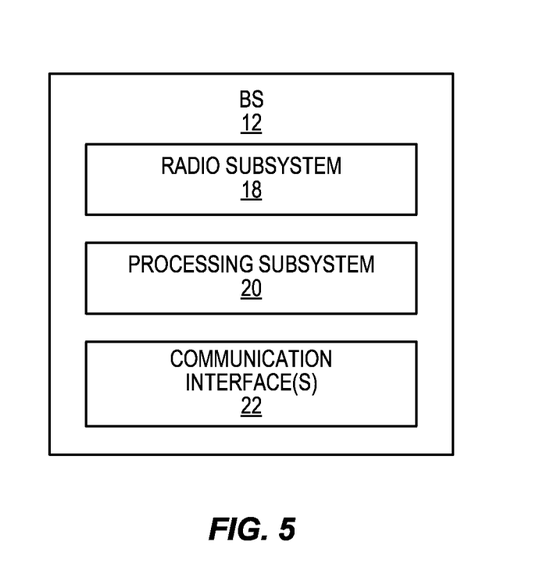
FIG. 5 is a block diagram of one of the base stations of the cellular communications network of FIG. 1 according to one embodiment of the present disclosure.

FIG. 5 is a block diagram of one of the base stations 12 of FIG. 1 according to one embodiment of the present disclosure. As illustrated, the base station 12 includes a radio subsystem 18 and a processing subsystem 20. The radio subsystem 18 generally includes analog and, in some embodiments, digital components for sending and receiving data to and from wireless devices 16 within the corresponding cell 14. In particular embodiments, the radio subsystem 18 may represent or include one or more Radio Frequency (RF) transceiver(s), or separate RF transmitter(s) and receiver(s), capable of transmitting suitable information wirelessly to and receiving suitable information from other network components or nodes. From a wireless communications protocol view, the radio subsystem 18 implements at least part of Layer 1 (i.e., the Physical or "PHY" Layer).

The processing subsystem 20 generally implements any remaining portion of Layer 1 not implemented in the radio subsystem 18 as well as functions for higher layers in the wireless communications protocol (e.g., Layer 2 (data link layer), Layer 3 (network layer), etc.). In particular embodiments, the processing subsystem 20 may comprise, for example, one or several general-purpose or special-purpose microprocessors or other microcontrollers programmed with suitable software and/or firmware to carry out some or all of the functionality of the base station 12 described herein. In addition or alternatively, the processing subsystem 20 may comprise various digital hardware blocks (e.g., one or more Application Specific Integrated Circuits (ASICs), one or more off-the-shelf digital and analog hardware components, or a combination thereof) configured to carry out some or all of the functionality of the base station 12 described herein. Additionally, in particular embodiments, the above described functionality of the base station 12 may be implemented, in whole or in part, by the processing subsystem 20 executing software or other instructions stored on a non-transitory computer-readable medium, such as Random Access Memory (RAM), Read Only Memory (ROM), a magnetic storage device, an optical storage device, or any other suitable type of data storage components.

Lastly, the base station 12 includes one or more communication interfaces 22. The one or more communication interfaces 22 include, for example, a communication interface to one or more components in a core network and/or a communication interface to one or more other base stations 12.

Figure 6:
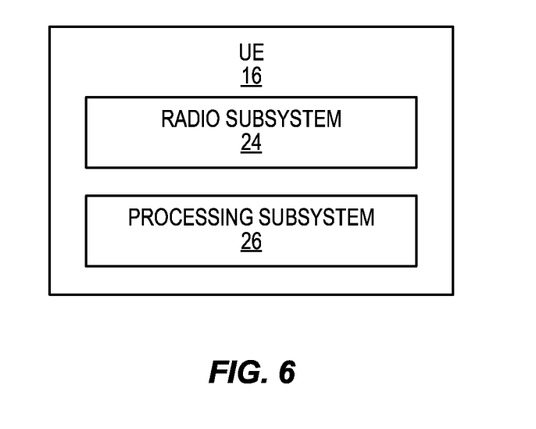
FIG. 6 is a block diagram of one of the wireless devices of FIG. 1 according to one embodiment of the present disclosure.

FIG. 6 is a block diagram of one of the wireless devices 16 of FIG. 1 according to one embodiment of the present disclosure. As illustrated, the wireless device 16 includes a radio subsystem 24 and a processing subsystem 26. The radio subsystem 24 generally includes analog and, in some embodiments, digital components for sending and receiving data to and from the base stations 12. In particular embodiments, the radio subsystem 24 may represent or include one or more RF transceivers, or separate RF transmitter(s) and receiver(s), capable of transmitting suitable information wirelessly to and receiving suitable information from other network components or nodes. From a wireless communications protocol view, the radio subsystem 24 implements at least part of Layer 1 (i.e., the Physical or "PHY" Layer).

The processing subsystem 26 generally implements any remaining portion of Layer 1 as well as functions for higher layers in the wireless communications protocol (e.g., Layer 2 (data link layer), Layer 3 (network layer), etc.). In particular embodiments, the processing subsystem 26 may comprise, for example, one or several general-purpose or special-purpose microprocessors or other microcontrollers programmed with suitable software and/or firmware to carry out some or all of the functionality of the wireless device 16 described herein. In addition or alternatively, the processing subsystem 26 may comprise various digital hardware blocks (e.g., one or more ASICs, one or more off-the-shelf digital and analog hardware components, or a combination thereof) configured to carry out some or all of the functionality of the wireless device 16 described herein. Additionally, in particular embodiments, the above described functionality of the wireless device 16 may be implemented, in whole or in part, by the processing subsystem 26 executing software or other instructions stored on a non-transitory computer-readable medium, such as RAM, ROM, a magnetic storage device, an optical storage device, or any other suitable type of data storage components. Of course, the detailed operation for each of the functional protocol layers, and thus the radio subsystem 24 and the processing subsystem 26, will vary depending on both the particular implementation as well as the standard or standards supported by the wireless device 16.

The following acronyms are used throughout this disclosure.

3GPP $3^{rd}$ Generation Partnership Project
ACK Acknowledgement
ASIC Application Specific Integrated Circuit
BCH Broadcast Channel
BS Base Station
C-RNTI Cell Radio Network Temporary Identifier
CG Closed Group
CQI Channel Quality Indication
CSI Channel State Information
CSMA/CA Carrier Sense Multiple Access/Collision Avoidance
D2D Device-to-Device
DL-SCH Downlink Shared Channel
DRX Discontinuous Reception eNB Enhanced Node B
GPS Global Positioning System
GSM Global System for Mobile Communications
HSPA High Speed Packet Access
IE Information Element
LTE Long Term Evolution
MAC-I Message Authentication Code for Data Integrity
OFDM Orthogonal Frequency Division Multiplexing
PCI Physical Cell Identity
PRACH Physical Random Access Channel
PRB Physical Resource Block
PUSCH Physical Uplink Shared Channel
RACH Random Access Channel
RAM Random Access Memory
RF Radio Frequency
ROM Read Only Memory
RRC Radio Resource Control
RSRP Reference Signal Received Power
RSRQ Reference Signal Received Quality
RSSI Received Signal Strength Indication
SIB System Information Block
SRB Signaling Radio Bearer
TA Timing Advance
TS Technical Specification
UL-SCH Uplink Shared Channel
WD Wireless Device Those skilled in the art will recognize improvements and modifications to the preferred embodiments of the present disclosure. All such improvements and modifications are considered within the scope of the concepts disclosed herein and the claims that follow.

What is claimed is:

1. A method of operation of a base station in a cellular communications network, comprising:
   receiving device-to-device information for a plurality of wireless devices, the device-to-device information comprising information related to availability of the plurality of wireless devices for device-to-device communication;
   transmitting device-to-device configuration information to a first wireless device, the device-to-device configuration information comprising information obtained from the device-to-device information for the plurality of wireless devices;
   receiving a device-to-device request from the first wireless device in a cell served by the base station to establish device-to-device communication, the device-to-device request being received at the base station subsequent to transmitting the device-to-device configuration information to the first wireless device;
   selecting a second wireless device for device-to-device communication with the first wireless device from the plurality of wireless devices that are available for device-to-device communication based on the device-to-device request and information regarding the plurality of wireless devices that are available for device-to-device communication;
   transmitting a device-to-device request acknowledgement to the first wireless device, the device-to-device request acknowledgement comprising information that enables the first wireless device to establish device-to-device communication with the second wireless device; and
   effecting transmission of a device-to-device reconfiguration message to the second wireless device, the device-to-device reconfiguration message comprising information that informs the second wireless device that the first wireless device has requested establishment of device-to-device communication.

2. The method of claim 1 wherein receiving the device-to-device information comprises receiving the device-to-device information for the second wireless device from the second wireless device.

3. The method of claim 1 wherein the second wireless device is located within a cell served by a second base station, and receiving the device-to-device information comprises receiving the device-to-device information for the second wireless device from the second base station.

4. The method of claim 1 wherein, for each wireless device of the plurality of wireless devices including the second wireless device, the device-to-device information for the wireless device comprises information that is indicative of one or more frequency bands supported by the second wireless device for device-to-device communication and at least one of a group consisting of: information that is indicative of content available for sharing from the second wireless device via device-to-device communication, and information that is indicative of one or more services available for sharing from the second wireless device via device-to-device communication.

5. The method of claim 4 wherein, for each wireless device of the plurality of wireless devices including the second wireless device, the device-to-device information for the wireless device further comprises at least one of a group consisting of: information that is indicative of a maximum data rate supported by the second wireless device for device-to-device communication, information that is indicative of a maximum connection time supported by the second wireless device for device-to-device communication, and information that is indicative of an activity of the second wireless device with respect to device-to-device communication.

6. The method of claim 4 wherein the cellular communications network is a Long Term Evolution cellular communications network, and receiving the device-to-device information comprises receiving the device-to-device information for the second wireless device via a Radio Resource Control message from the second wireless device, the Radio Resource Control message being one of a group consisting of: a Radio Resource Control Connection Request message, a Radio Resource Control Connection Reestablishment message, and a Radio Resource Control message specifically defined for transmission of device-to-device information.

7. The method of claim 6 wherein the Radio Resource Control message is a Radio Resource Control Connection Request message having an establishment cause set to a value that is indicative of device-to-device communication.

8. The method of claim 4 further comprising, prior to receiving the device-to-device information, transmitting information that triggers transmission of the device-to-device information by the plurality of wireless devices.

9. The method of claim 4 wherein the device-to-device configuration information comprises at least one of a group consisting of: information that is indicative of the plurality of wireless devices available for device-to-device communication, information that is indicative of content available for sharing from the plurality of wireless devices via device-to-device communication, and information that is indicative of services available for sharing from the plurality of wireless devices via device-to-device communication.

10. The method of claim 4 wherein the device-to-device configuration information comprises information that is indicative of: the plurality of wireless devices, frequency bands supported by the plurality of wireless devices for device-to-device communication, and at least one of a group consisting of content available for sharing from the plurality of wireless devices via device-to-device communication and services available for sharing from the plurality of wireless devices via device-to-device communication.

11. The method of claim 10 wherein transmitting the device-to-device configuration information comprises periodically broadcasting the device-to-device configuration information via a control channel.

12. The method of claim 10 wherein the cellular communications network is a Long Term Evolution cellular communications network, and transmitting the device-to-device configuration information comprises transmitting the device-to-device configuration information in a System Information Block.

13. The method of claim 10 wherein the device-to-device configuration information comprises information regarding up to at most a predefined maximum number of the plurality of wireless devices.

14. The method of claim 13 wherein the predefined maximum number of the plurality of wireless devices is dynamically adjusted.

15. The method of claim 4 wherein:
the device-to-device request comprises one or more preferences of the first wireless device for device-to-device communication; and
selecting the second wireless device comprises selecting the second wireless device from the plurality of wireless devices based on the one or more preferences of the first wireless device and the device-to-device information for the plurality of wireless devices.

16. The method of claim 15 wherein the one or more preferences of the first wireless device comprise at least one of a group consisting of: one or more preferred wireless devices from the plurality of wireless devices with which to establish device-to-device communication and one or more preferred frequency bands for device-to-device communication.

17. The method of claim 15 wherein selecting the second wireless device is further based on at least one of a group consisting of: geographic locations of the first wireless device and the second wireless device and radio locations of the first wireless device and the second wireless device.

18. The method of claim 15 wherein the cellular communications network is a Long Term Evolution cellular communications network, and receiving the device-to-device request comprises receiving the device-to-device request via a Radio Resource Control message from the first wireless device, the Radio Resource Control message being one of a group consisting of: a Radio Resource Control Connection Request message, a Radio Resource Control Connection Reestablishment message, and a Radio Resource Control message specifically defined for transmission of the device-to-device request.

19. The method of claim 15 wherein the device-to-device request acknowledgement comprises information that identifies the second wireless device in the cellular communications network, information that is indicative of a Random Access Channel preamble, and information that is indicative of a radio resource to be used by the first wireless device for a random access procedure to establish device-to-device communication with the second wireless device.

20. The method of claim 19 wherein transmitting the device-to-device request acknowledgement comprises transmitting the device-to-device request acknowledgement via a Radio Resource Control message to the first wireless device, the Radio Resource Control message being one of a group consisting of: a Radio Resource Control Connection Reconfiguration message and a Radio Resource Control message specifically defined for transmission of the device-to-device request acknowledgement.

21. The method of claim 19 wherein the device-to-device reconfiguration message comprises at least one of a group consisting of: information that identifies the first wireless device in the cellular communications network, content desired by the first wireless device, one or more services desired by the first wireless device, and the radio resource to be used by the first wireless device for the random access procedure to establish device-to-device communication with the second wireless device.

22. The method of claim 21 wherein effecting transmission of the device-to-device reconfiguration message to the second wireless device comprises effecting transmission of the device-to-device reconfiguration message to the second wireless device via a Radio Resource Control message to the second wireless device, the Radio Resource Control message being one of a group consisting of: a Radio Resource Control Connection Reconfiguration message and a Radio Resource Control message specifically defined for transmission of the device-to-device request acknowledgement.

23. The method of claim 1 wherein effecting transmission of the device-to-device reconfiguration message to the second wireless device comprises transmitting the device-to-device reconfiguration message to the second wireless device.

24. The method of claim 1 wherein the second wireless device is located within a cell served by a second base station, and effecting transmission of the device-to-device reconfiguration message to the second wireless device comprises instructing the second base station to transmit the device-to-device reconfiguration message to the second wireless device.

25. A base station for a cellular communications network, comprising:
a radio subsystem; and
a processing subsystem associated with the radio subsystem configured to:
receive, via the radio subsystem, device-to-device information for a plurality of wireless devices, the device-to-device information comprising information related to availability of the plurality of wireless devices for device-to-device communication;
transmit, via the radio subsystem, device-to-device configuration information to a first wireless device, the device-to-device configuration information comprising information obtained from the device-to-device information for the plurality of wireless devices;
receive, via the radio subsystem, a device-to-device request from the first wireless device in a cell served by the base station to establish device-to-device communication, the device-to-device request being received at the base station subsequent to transmitting the device-to-device configuration information to the first wireless device;
select a second wireless device for device-to-device communication with the first wireless device from the plurality of wireless devices that are available for device-to-device communication based on the device-to-device request and information regarding the plurality of wireless devices that are available for device-to-device communication;
transmit, via the radio subsystem, a device-to-device request acknowledgement to the first wireless device, the device-to-device request acknowledgement comprising information that enables the first wireless device to establish device-to-device communication with the second wireless device; and effect transmission of a device-to-device reconfiguration message to the second wireless device, the device-to-device reconfiguration message comprising information that informs the second wireless device that the first wireless device has requested establishment of device-to-device communication.

26. A method of operation of a wireless device in a cellular communications network, comprising:

receiving device-to-device configuration information from a base station, the device-to-device configuration information comprising information related to availability of a plurality of wireless devices for device-to-device communication;

transmitting a device-to-device request to the base station in the cellular communications network, the device-to-device request being based on the device-to-device configuration information received from the base station;

in response to transmitting the device-to-device request, receiving a device-to-device acknowledgement from the base station, the device-to-device request acknowledgement comprising information that enables the wireless device to establish device-to-device communication with a second wireless device;

transmitting a device-to-device access request to the second wireless device using the information in the device-to-device request acknowledgement;

receiving a device-to-device access acknowledgment from the second wireless device in response to the device-to-device access request; and performing device-to-device communication with the second wireless device.

27. The method of claim 26 further comprising, prior to transmitting the device-to-device request:

selecting one or more preferences based on the device-to-device configuration information;

wherein the device-to-device request comprises the one or more preferences.

28. The method of claim 27 wherein the device-to-device configuration information comprises at least one of a group consisting of: information that is indicative of the plurality of wireless devices available for device-to-device communication, information that is indicative of content available for sharing from the plurality of wireless devices via device-to-device communication, and information that is indicative of services available for sharing from the plurality of wireless devices via device-to-device communication.

29. The method of claim 27 wherein the device-to-device configuration information comprises information that is indicative of: the plurality of wireless devices available for device-to-device communication, frequency bands supported by the plurality of wireless devices for device-to-device communication, and at least one of a group consisting of content available for sharing from the plurality of wireless devices via device-to-device communication and services available for sharing from the plurality of wireless devices via device-to-device communication.

30. The method of claim 29 wherein selecting the one or more preferences comprises selecting at least one of a group consisting of: one or more preferred devices for device-to-device communication from the plurality of wireless devices, one or more preferred frequency bands from the frequency bands supported by the plurality of wireless devices, preferred content from the content available for sharing from the plurality of wireless devices, and one or more preferred services from the services available for sharing from the plurality of wireless devices.

31. The method of claim 27 wherein the cellular communications network is a Long Term Evolution cellular communications network, and transmitting the device-to-device request comprises transmitting the device-to-device request via a Radio Resource Control message, the Radio Resource Control message being one of a group consisting of: a Radio Resource Control Connection Request message, a Radio Resource Control Connection Reestablishment message, and a Radio Resource Control message specifically defined for transmission of the device-to-device request.

32. The method of claim 27 wherein the device-to-device request acknowledgement comprises information that identifies the second wireless device in the cellular communications network, information that is indicative of a Random Access Channel preamble, and information that is indicative of a radio resource to be used by the wireless device for a random access procedure to establish device-to-device communication with the second wireless device.

33. The method of claim 32 wherein receiving the device-to-device request acknowledgement comprises receiving the device-to-device request acknowledgement via a Radio Resource Control message from the base station, the Radio Resource Control message being one of a group consisting of: a Radio Resource Control Connection Reconfiguration message and a Radio Resource Control message specifically defined for transmission of the device-to-device request acknowledgement.

34. The method of claim 32 wherein transmitting the device-to-device access request comprises transmitting the device-to-device access request utilizing the Random Access Channel preamble and the radio resource indicated by the information in the device-to-device request acknowledgement.

35. The method of claim 34 wherein the device-to-device request acknowledgement further comprises information that is indicative of a transmit power level to be used by the wireless device for the random access procedure to establish device-to-device communication with the second wireless device, and transmitting the device-to-device access request further comprises transmitting the device-to-device access request at the transmit power level indicated by the information in the device-to-device request acknowledgement.

36. The method of claim 34 wherein the device-to-device access acknowledgment includes a grant of access for device-to-device communication with the second wireless device as well as timing information that enables synchronization between the wireless device and the second wireless device for device-to-device communication.

37. The method of claim 26 wherein performing device-to-device communication comprises performing device-to-device communication in one of a group consisting of: an uplink frequency band and a downlink frequency band of the cellular communications network.

38. The method of claim 26 wherein performing device-to-device communication comprises performing device-to-device communication in an unlicensed frequency band.

39. A wireless device configured to operate in a cellular communications network comprising:

a radio subsystem; and a processing subsystem associated with the radio subsystem configured to:

receive, via the radio subsystem, device-to-device configuration information from a base station, the device-to-device configuration information comprising information related to availability of a plurality of wireless devices for device-to-device communication;

transmit, via the radio subsystem, a device-to-device request to the base station in the cellular communications network, the device-to-device request being based on the device-to-device configuration information received from the base station;

receive, via the radio subsystem, a device-to-device acknowledgement from the base station in response to the device-to-device request, the device-to-device acknowledgement comprising information that enables the wireless device to establish device-to-device communication with a second wireless device;

transmit, via the radio subsystem, a device-to-device access request to the second wireless device using the information in the device-to-device acknowledgement;

receive, via the radio subsystem, a device-to-device access acknowledgment from the second wireless device in response to the device-to-device access request; and perform device-to-device communication with the second wireless device.

* * * * *